United States Patent Office 3,560,494
Patented Feb. 2, 1971

3,560,494
PROCESS FOR PHOSPHONIC ETHYLATION OF AMINES
Frederick Charles Copp, London, England, assignor to Burroughs Wellcome & Co (U.S.A.) Inc., Tuckahoe, N.Y.
No Drawing. Filed Oct. 18, 1966, Ser. No. 587,394
Int. Cl. C07d 87/26
U.S. Cl. 260—247    9 Claims

ABSTRACT OF THE DISCLOSURE

A method for preparing the cation of Formula I

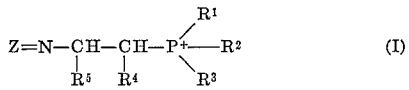

which comprises reacting a cation of Formula II

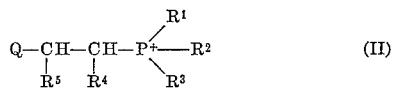

with a secondary amine Z=NH; where $R^1$, $R^2$ and $R^3$ are lower alkyl or phenyl, $R^4$ is hydrogen, $R^5$ is hydrogen or lower alkyl, Q is phenoxy unsubstituted or substituted with lower alkyl, lower alkoxy or halogeno, Z=N— is unsubstituted di-lower alkylamino, pyrrolidino, morpholino or piperidino, in all definitions above lower alkyl and lower alkoxy have 1 to 5 carbons. The products of this method are useful as intermediates in the preparation of well known antihistimines and analgesics.

This invention relates to the phosphonioethylation of secondary amines.

The use of trialkyl or triphenyl vinyl phosphonium salts in phosphonioethylation reactions with secondary amines is already known, and has, for instance, been described by Keough, T. P., et al. J. org. chem. 1964, 29, 631–635, or Schweizer, E. E., et al., Ibid, 1964, 29, 1746–1751. These methods, however, usually require refluxing at elevated temperatures for several hours, and the substituted vinyl phosphonium salt may have to be prepared from the corresponding 2-phenoxyethyl phosphonium compound by heating it in a nonhydroxylic solvent (Ibid, pages 1747 and 1749).

The object of the present invention is to provide a simplified and efficient process, which could directly use 2-phenoxyethyl phosphonium compounds for phosphonioethylation.

According to the present invention in one aspect there is provided a method for the preparation of a compound containing the cation of Formula I,

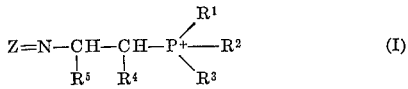

which method comprises reacting a compound containing the cation of Formula II

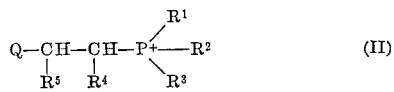

with a secondary amine Z=NH in a nonacidic polar solvent such as a dialkyl sulphoxide; wherein $R^1$, $R^2$ and $R^3$ are the same or different and each is a lower alkyl group or a phenyl group optionally substituted, for instance with a lower alkyl or a lower alkoxy group or a halogeno radical, $R^4$ is a hydrogen atom or a lower alkyl group, $R^5$ is a hydrogen atom or a lower alkyl group, Q is a phenoxy group optionally substituted, for instance with a lower alkyl or a lower alkoxy group or halogeno radical, and Z=N— is a substituted or unsubstituted dialkylamino group or a cyclic amino group, such as a pyrrolidino, morpholino or piperidino group or an optionally substituted 1,2,3,4-tetrahydro-isoquinol-2-yl group. In a particular aspect the invention provides a method for the preparation of the compounds hereinbefore defined, which have a hydrogen atom substituted for $R^5$.

The nature of the optional substituents of the phenyl groups, such as a lower alkyl or alkoxy group, or a halogen radical, is irrelevant, since these groups either appear in the byproduct of the reaction or are eliminated when the main product is further processed.

The term "lower alkyl" is denoted to mean 1 to 5 carbon atoms, and the substitution of the 1,2,3,4-tetrahydro-isoquinol-2-yl group may include 1-2′-ketoalkyl groups, such as a 1-2′-ketopropyl or 1-2′-keto-3′-(1,2,3,4-tetrahydro-6,7-dimethoxy-isoquinol-1-yl)propyl group, or lower alkoxy groups at C(6) and C(7).

The anionic part of the compounds containing the cation of Formula I or II may conveniently consist of a conjugate base derived from a strong inorganic acid, such as, for example, a bromide or sulphate ion.

The compounds of Formula I manufactured by the present method can be used as intermediates in well known reactions which takes advantage of the reactivity of the substituted phosphonium group. For example, a corresponding phosphorane, obtained from a phosphonium salt by a treatment with an alkali, readily undergoes a Wittig type of condensation with an aldehyde, or with a ketone at elevated temperatures. A (1-2′-ketopropyl-1,2,3,4-tetrahydroisoquinol-2-yl)ethyltriphenyl - phosphonium derivative can, for instance, be ring closed to provide a corresponding 1,4,6,7-tetrahydro - 11bH - benzo(a)quinolizine derivative. The benzo(a)quinolizine ring system appears in a number of alkaloids, such as tubulosine or emetine, and the synthesis of this ring system is usually an essential step in a process providing analogues or homologues of such compounds.

In another aspect the present invention provides some compounds containing the cation of Formula I which are novel themselves and are useful in this respect. Such compounds include 2 - piperidinoethyltriphenylphosphonium, 2 - piperidinoethyltributylphosphonium, 2 - pyrrolidinoethyltriphenylphosphonium, 2-pyrrolidinopropyltriphenylphosphonium, 2 - morpholinoethyltriphenylphosphonium, 2 - (6,7 - dimethoxy) - 1-2′-ketopropyl-1,2,3,4-tetrahydroisoquinol - 2 - yl)ethyltriphenylphosphonium, 2-(1,2,3,4-tetrahydro - 6,7 - dimethoxy-1-[2-oxo-3-(1,2,3,4-tetrahydro - 6,7 - dimethoxyisoquinol - 1)propyl]-2-isoquinolyl) ethyltriphenylphosphonium salts, and particularly the bromides of these cations.

For the purposes of the present invention anhydrous dimethyl sulphoxide has been found convenient as a solvent providing the reaction medium. Although the reactions proceed slowly at room temperature, slightly elevated temperatures, between 40° C. and 60° C., have been preferred to shorten the reaction time.

The following examples illustrate the invention.

EXAMPLE 1

Piperidine (2.6 g.) was added to a suspension of 2-phenoxyethyltriphenylphosphonium bromide (4.3 g.) in dry dimethyl sulphoxide (8 ml.). The temperature rose spontaneously to 40° C., whilst the bulk of the phosphonium salt dissolved. The resulting mixture was stirred at 40° C. for a further 10 minutes; during this time, any unchanged phosphonium salt dissolved and a compact crystalline solid began to separate. Dry diethylether was added. The resulting 2-piperidinoethyltriphenylphosphonium bromide was collected and recrystallised by precipitation from chloroform with diethyl ether to give colourless crystals, M.P. 184–186° C.; this solid contained chloroform of crystallisation which was removed by heating at 100° C. in vacuo; the residual pure material had an M.P. 189–190° C.

EXAMPLE 2

6,7-dimethoxy - 1,2' - ketopropyl-1,2,3,4-tetrahydro-isoquinoline hydrochloride (Chapman et al., J. Chem. Soc. 1962, 2471) (20 g.) was dissolved in water (20 ml.) and excess potassium carbonate added. The precipitated oil was extracted three times with methylene chloride and the combined extracts were dried with anhydrous magnesium sulphate, filtered and evaporated. Benzene (80 ml.) was added to the residue, and the mixture was refluxed through a Dean-Stark trap to remove any residual water. The benzene was removed in vacuo to give 6,7-dimethoxy-1-2'-ketopropyl-1,2,3,4-tetrahydroisoquinoline as a gum.

Dry dimethyl sulphoxide (20 ml.) was added to this residue and the resulting suspension stirred during the addition of 2-phenoxyethyltriphenylphosphonium bromide (10 g.). A clear solution slowly formed whilst the temperature rose spontaneously to 30° C. The mixture stood overnight at room temperature, warmed to 50°–60° C. for 2 hours and then poured into dry ether (1 l.) with stirring. A gum was precipitated which was slowly transformed into a resinous solid, 2-(6,7-dimethoxy-1-2'-ketopropyl - 1,2,3,4 - tetrahydroisoquinol-2-yl)ethyltriphenylphosphonium bromide. This product was collected, washed with fresh dry ether and dried immediately in vacuo to give a deliquescent powder, M.P. approx. 100° C.

The infrared absorption spectrum of a mull in fluorolube showed a strong band at 1690 cm.$^{-1}$ which was attributed to the presence of a carbonyl group.

This product (13 g.) was dissolved in dry dimethyl sulphoxide (20 ml.) and the resulting solution freed from traces of mixture by shaking for 24 hours with predried molecular sieve. The supernatant liquors were decanted from the drying agent and treated slowly with a solution of sodium hydride (0.53 g.) in dry dimethyl sulphoxide (10 ml.). The mixture became warm and was finally heated between 80° C. for 2 hours. After cooling, it was poured into diethyl ether, when an oil separated. The ethereal solution was decanted and the residue was extracted with fresh ether. The combined ethereal solutions were extracted with 2 N-hydrochloric acid; the acidic extract was basified with excess of concentrated ammonia to precipitate an oil which was isolated with ether in the usual way. The infrared absorption spectrum of this product showed no strong band attributable to a carbonyl group. With ethanolic picric acid it gave 1,4,6,7-tetrahydro - 9,10 - dimethoxy - 2-methyl-11bH-benzo(a)-quinolizine picrate as a yellow crystalline solid, M.P. 175–176° C.

EXAMPLES 3–6

By use of the methods described in Examples 1 and 2 the following compounds were made; the melting points refer to materials which have been dried at 100° C. in vacuo.

Example 3: 2-diethylaminoethyltriphenylphosphonium bromide, M.P. 180° C.

Example 4: 2 - pyrrolidinoethyltriphenylphosphonium bromide, M.P. 190° C.

Example 5: 2 - morpholinoethyltriphenylphosphonium bromide, M.P. 181–185° C.

Example 6: 2 - dimethylaminoethyltriphenylphosphonium bromide, M.P. 204–205° C.

EXAMPLE 7

A mixture of 1-bromo-2-phenoxypropane (29 g.) triphenylphosphine (35 g.) and phenol (200 g.) was heated at 90–95° C. for 48 hours. On pouring into a mixture of dry diethyl ether (1.5 l.) and light petroleum (B.P. 40–60° C.; 100 ml.) a gum separated which subsequently crystallised. This solid was collected, washed with fresh dry ether and dried in vacuo, M.P. 81–82° C. The product was a complex of 2 - phenoxypropyltriphenylphosphonium bromide and phenol in equimolecular proportions.

Pyrrolidine (2.5 ml.) was added to a solution of this complex (5 g.) in dry dimethylsulphoxide (5 ml.). The temperature of the mixture rose spontaneously to 30° C. and finally was warmed to 55–60° C. for 30 minutes. The addition of dry ether produced a gum which subsequently crystallised. The product, 2 - pyrrolidinopropyltriphenylphosphonium bromide, was collected, washed with fresh dry ether and dried in vacuo, M.P. 154–155° C.

EXAMPLE 8

A mixture of 2-phenoxyethylbromide (50 g.), tributylphosphine (50 g.) and phenol (500 g.) was heated to 90° C. for 40 hours. On pouring into a mixture of dry diethyl ether (1 l.) and light petroleum (B.P. 40–60° C.; 500 ml.) an oil separated. The mother liquors were decanted and the residue repeatedly washed with fresh dry ether until it crystallised. This solid was dried in vacuo, M.P. 45–50° C.

Piperidine (5.1 g.) was added to a solution of this solid (4.0 g.) in dry dimethylsulphoxide (10 ml.). The mixture was warmed to 50° C. for 2 hours and then poured into dry ether (100 ml.). An oil separated; the mother liquors were decanted and the residue washed three times with fresh dry ether. On standing at 0° C. under a further amount of dry ether the product slowly crystallised. It was collected after 6 weeks and dried in vacuo, M.P. 63–65° C. Analysis showed that the product overwhelmingly contained 2-piperidinoethyl tributylphosphonium bromide.

EXAMPLE 9

Meso-1,3-bis(1,2,3,4-tetrahydro-6,7-dimethoxy - 1 - isoquinolyl)acetone (2.4 g.) was suspended in dry dimethyl sulphoxide (2.6 g.) and 2-phenoxyethyltriphenylphosphonium bromide (2.6 g.) was added. Dried nitrogen was slowly bubbled through the mixture which gradually passed from a thixotropic suspension to a clear solution over a period of one hour. Precipitation with dry ether afforded 2 - (1,2,3,4-tetrahydro-6,7-dimethoxy-1-[2-oxo-3-(1,2,3,4 - tetrahydro-6,7-dimethoxyisoquinolyl-1)propyl]-2-isoquinolyl)ethyltriphenylphosphonium bromide as a gum.

What is claimed is:

1. A method for the preparation of a cation of Formula I

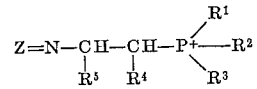

which method comprises reacting a cation of Formula II.

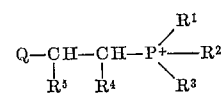

with a secondary amine Z=NH in a nonacidic polar solvent wherein $R^1$, $R^2$ and $R^3$ are lower alkyl or phenyl, $R^4$ is hydrogen, $R^5$ is a hydrogen atom or lower alkyl, Q is a phenoxy group unsubstituted or substituted with lower alkyl, lower alkoxy or halogeno radical, and Z=N— is unsubstituted di-lower alkylamino, pyrrolidino, morpholino or piperidino, in all definitions above lower alkyl and lower alkoxy have 1 to 5 carbon atoms.

2. A method according to claim 1, wherein $R^5$ is hydrogen.

3. A method according to claim 2, wherein Z=N— is pyrrolidino.

4. A method according to claim 2, wherein the Z=N— is morpholino.

5. A method according to claim 2, wherein the Z=N— is piperidino.

6. A method according to claim 1, wherein the polar solvent is a dialkyl sulphoxide.

7. A method according to claim 6, wherein the polar solvent is dimethyl sulphoxide.

8. A method according to claim 1, wherein $R^1$, $R^2$, and $R^3$ are phenyl.

9. The method of claim 7 wherein $R^1$, $R^2$ and $R^3$ are all phenyl or all butyl.

References Cited

Schweizer et al. J. Org. Chem. vol. 29, pp. 1746, 1747–1749 (1964).

ALEX MAZEL, Primary Examiner

JOSE TOVAR, Assistant Examiner

U.S. Cl. X.R.

260—293, 326.61, 583